United States Patent
Wu

(10) Patent No.: US 11,811,938 B2
(45) Date of Patent: Nov. 7, 2023

(54) TOKENIZATION OF ARBITRARY DATA TYPES

(71) Applicant: MICRO FOCUS LLC, Santa Clara, CA (US)

(72) Inventor: Thomas Wu, Santa Clara, CA (US)

(73) Assignee: Micro Focus LLC, Santa Clara, CA (US)

(*) Notice: Subject to any disclaimer, the term of this patent is extended or adjusted under 35 U.S.C. 154(b) by 576 days.

(21) Appl. No.: 16/722,378

(22) Filed: Dec. 20, 2019

(65) Prior Publication Data
US 2021/0194695 A1    Jun. 24, 2021

(51) Int. Cl.
*H04L 9/32* (2006.01)
*G06F 16/22* (2019.01)

(52) U.S. Cl.
CPC ........ *H04L 9/3234* (2013.01); *G06F 16/2255* (2019.01)

(58) Field of Classification Search
None
See application file for complete search history.

(56) References Cited

U.S. PATENT DOCUMENTS

| 6,324,286 | B1* | 11/2001 | Lai ..................... H04L 9/0637 380/37 |
| 7,580,519 | B1* | 8/2009 | Goh .................... H04L 9/0625 380/42 |
| 8,578,176 | B2 | 11/2013 | Mattsson |
| 9,953,171 | B2 | 4/2018 | Saxena et al. |
| 10,069,804 | B2 | 9/2018 | Rozenberg et al. |
| 10,114,963 | B1 | 10/2018 | Griffin et al. |
| 2013/0198851 | A1* | 8/2013 | Spies .................... G06Q 99/00 726/26 |
| 2014/0046853 | A1* | 2/2014 | Spies .................... H04L 9/0625 705/51 |
| 2014/0201084 | A1 | 7/2014 | Dagenais et al. |
| 2016/0112196 | A1* | 4/2016 | Hars ..................... G06F 21/602 713/189 |
| 2017/0033922 | A1* | 2/2017 | Michiels ................ H04L 9/002 |
| 2017/0294148 | A1* | 10/2017 | Isobe ................... H04L 9/002 |
| 2018/0062828 | A1* | 3/2018 | Cioranesco ........... H04L 9/0618 |

(Continued)

FOREIGN PATENT DOCUMENTS

| CN | 103051442 A | * | 4/2013 |
| CN | 103051442 B | * | 6/2015 |

OTHER PUBLICATIONS

Taiwo Gabriel Omomule, Encryption and tokenization—Based system for credit card information security, Adekunle Ajasin University, Aug. 2018, 12 pages total.

(Continued)

*Primary Examiner* — Polina G Peach
*Assistant Examiner* — Anugeetha Kunjithapatham
(74) *Attorney, Agent, or Firm* — Sheridan Ross P.C.

(57) ABSTRACT

A computing device includes a processor and a machine-readable storage storing instructions. The instructions are executable by the processor to: receive a bit vector representing input data to be tokenized; divide the bit vector into two vector portions; and perform a plurality of rounds of a Feistel network on the two vector portions, each round including converting one vector portion using a table-based hash function that combines multiple tokens retrieved from at least one token table.

20 Claims, 10 Drawing Sheets

(56) References Cited

U.S. PATENT DOCUMENTS

2018/0285864 A1  10/2018  Dill et al.
2021/0160055 A1*  5/2021  Tiikkainen ............ H04L 9/0637

OTHER PUBLICATIONS

Townsend Security, Tokenization—White Paper, "A Cost Effective and Easy Path to Compliance and Data Protection," 2010, 5 pages total.

* cited by examiner

Input Portion: [ 6 0 3 ... ]

FIG. 5C

TOKENIZATION OF ARBITRARY DATA TYPES

BACKGROUND

A business organization (e.g., a retail business, a professional corporation, a financial institution, and so forth) may collect, process and/or store data that represents sensitive or confidential information about individuals or business organizations. For example, a commercial website may conduct a sales transaction using the bank account number of a customer. Such sensitive data may be protected from unauthorized access by techniques such as encryption and tokenization.

BRIEF DESCRIPTION OF THE DRAWINGS

Some implementations are described with respect to the following figures.

FIGS. 5A-5C are illustrations of an example operation, in accordance with some implementations.

DETAILED DESCRIPTION

In order to protect sensitive or confidential data from improper access, some systems may convert or "tokenize" sensitive data into tokens (e.g., strings of characters). Some tokenization techniques may include using token tables to map input data elements to tokens, and replacing the input data elements with the corresponding tokens. However, conventional tokenization techniques may be limited to input data having a defined format. For example, in conventional tokenization systems, the token table(s) may be predefined to convert a numerical data element having a fixed number of digits (e.g., a credit card number). Accordingly, such conventional tokenization systems may not be usable for input data that has arbitrary data sizes and/or formats.

As described further below with reference to FIGS. 1-8, some implementations may provide improved tokenization for input data with arbitrary sizes and/or formats. In some implementations, the input data may be processed through multiple rounds of a Feistel network, where each round includes performing a table-based hash function. As used herein, the term "table-based hash function" refers to a function that combines multiple values retrieved from one or more token tables to generate an output value. In some implementations, the table-based hash function may be applied to uniform sized portions of the input data, without regard to the specific format of the input data. Accordingly, implementations may provide an improved tokenization system that can tokenize arbitrary data types in a secure manner.

Figure 1:
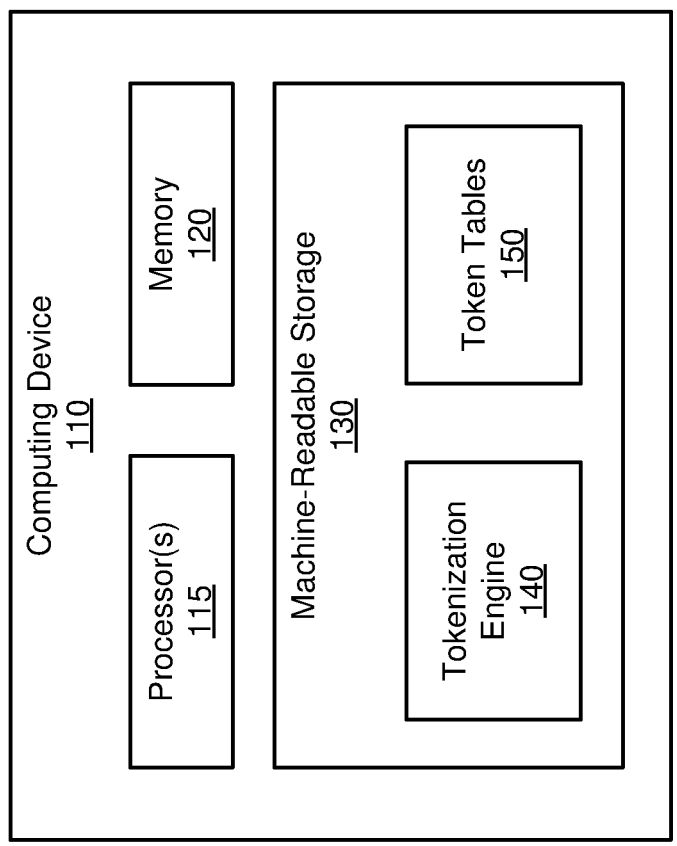
FIG. 1 is a schematic diagram of an example system, in accordance with some implementations.

FIG. 1 shows a schematic diagram of an example computing device 110, in accordance with some implementations. The computing device 110 may be, for example, a computer, a portable device, a server, a network device, an appliance, a communication device, etc. In other examples, the computing device 110 may be a server rack system including multiple computing modules (e.g., blade servers), networking devices, storage devices, power supply components, and so forth. Further, in yet other examples, the computing device 110 may be a computing cluster, a datacenter, a distributed system, and so forth.

In some implementations, the computing device 110 may include processor(s) 115, memory 120, and machine-readable storage 130. The processor(s) 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 may store a tokenization engine 140 and token tables 150. In some examples, the tokenization engine 140 may be implemented in executable instructions stored in the machine-readable storage 130 (e.g., software and/or firmware). However, the tokenization engine 140 may be implemented in any suitable manner. For example, some or all of the tokenization engine 140 could be hard-coded as circuitry included in the processor(s) 115 and/or the computing device 110. In other examples, some or all of the tokenization engine 140 could be implemented on a remote computer (not shown), as web services, and so forth. In another example, the tokenization engine 140 may be implemented in one or more controllers of the computing device 110.

In one or more implementations, the tokenization engine 140 may receive input data to be tokenized. For example, the input data may include sensitive or confidential information about individuals or business organizations (e.g., names, financial information, medical histories, salaries, etc.). In some implementations, the tokenization engine 140 may process the input data through multiple rounds of a Feistel network. Further, in each round of the Feistel network, the tokenization engine 140 may generate an output value by performing a table-based hash function to combine multiple values retrieved from the token tables 150. The functionality of the tokenization engine 140 is described further below with reference to FIGS. 2-8, which show examples in accordance with various implementations.

Figure 2:
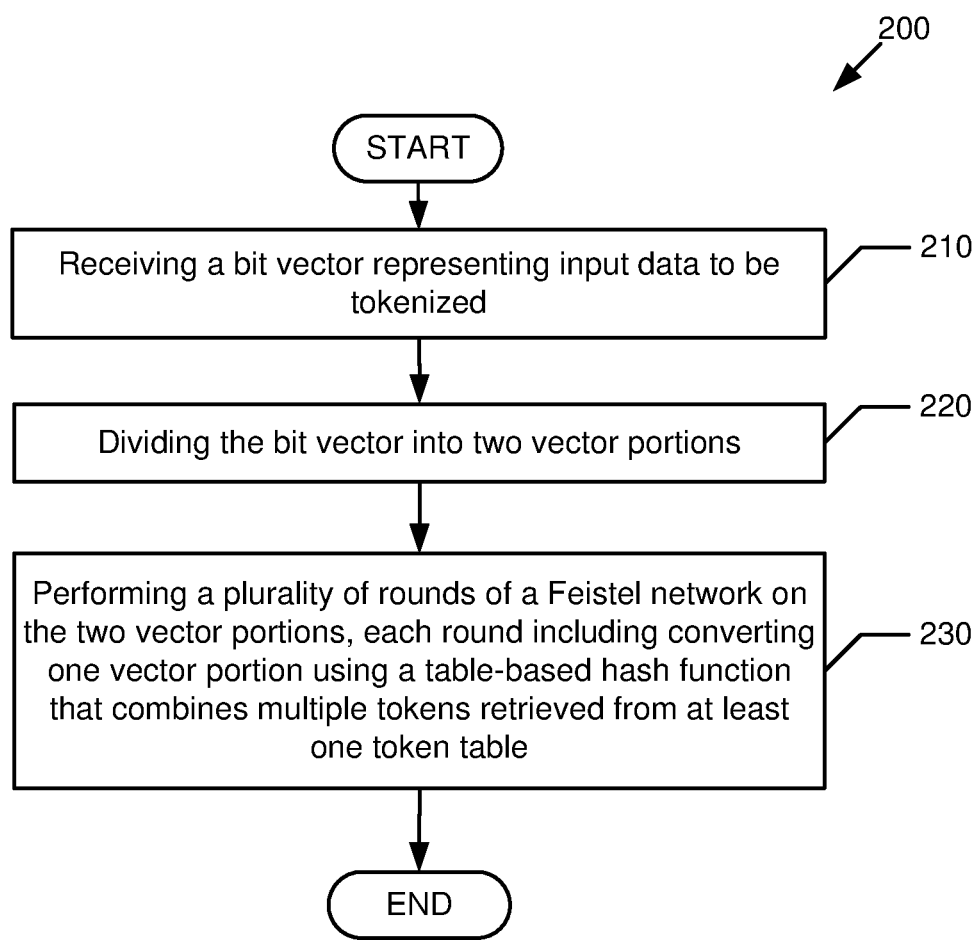
FIG. 2 is a flow diagram of an example process, in accordance with some implementations.

Referring now to FIG. 2, shown is an example process 200 for tokenizing data, in accordance with some implementations. In some examples, the process 200 may be performed by some or all of the tokenization engine 140 shown in FIG. 1. The process 200 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 200 may be described below with reference to FIG. 3, which shows an example operation 300 of a Feistel network in accordance with some implementations. However, other implementations are also possible.

Block 210 may include receiving a bit vector representing input data to be tokenized. Block 220 may include dividing the bit vector into two vector portions. For example, referring to FIGS. 1 and 3, the tokenization engine 140 may receive an input vector 305 including sensitive data to be protected (e.g., credit card number, password, and so forth). The tokenization engine 140 may divide the input vector 305 into Input Portion A 310 and Input Portion B 315.

Figure 3:
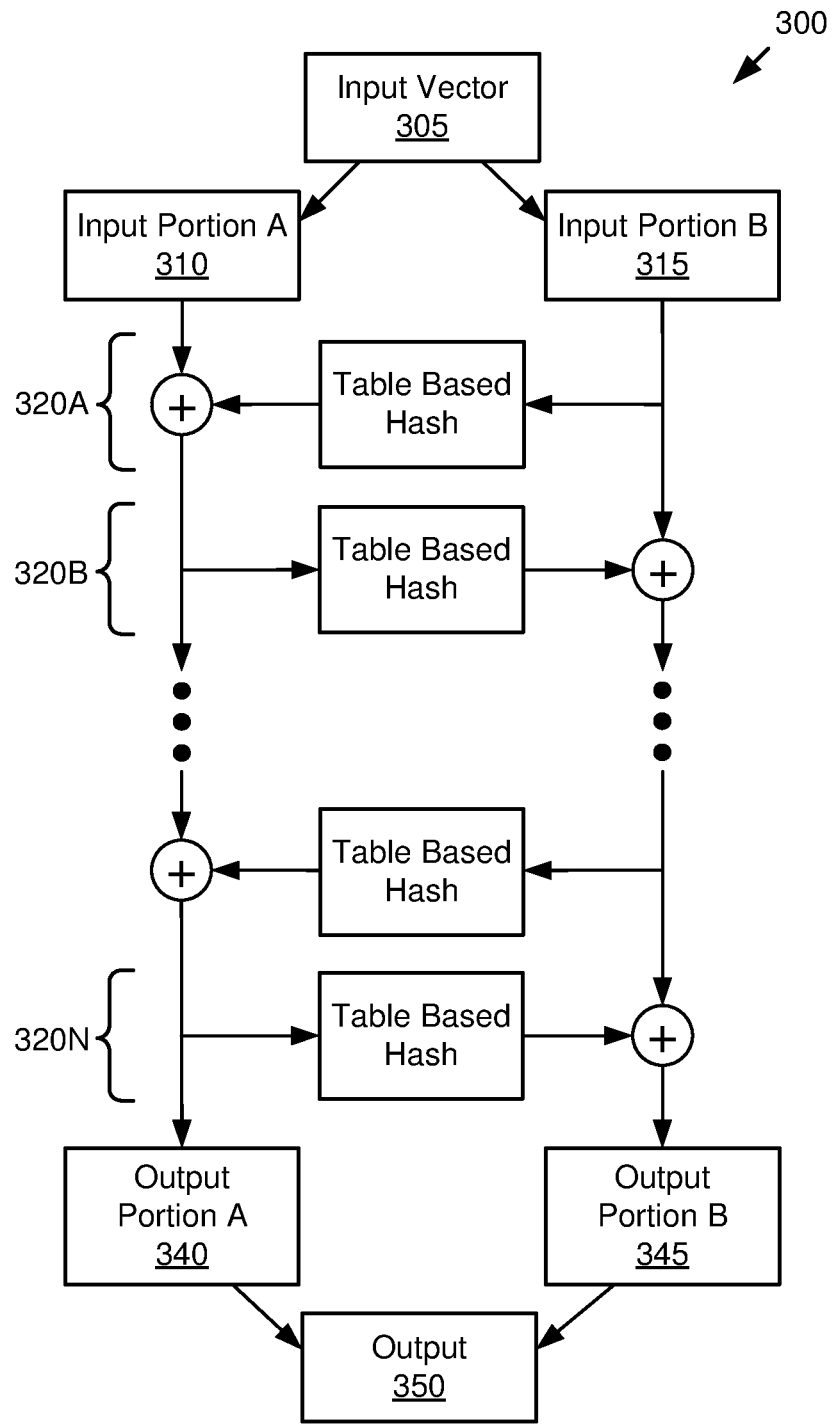
FIG. 3 is an illustration of an example operation, in accordance with some implementations.

Block 230 may include performing a plurality of rounds of a Feistel network on the two vector portions, each round including converting one vector portion using a table-based hash function that combines multiple tokens retrieved from at least one token table. For example, referring to FIGS. 1 and 3, the tokenization engine 140 may perform multiple rounds 320A-320N of a Feistel network (also referred to collectively as "rounds 320"). As shown in FIG. 3, a first round 320A may include applying a table-based hash function to the Input Portion B 315, and then performing an exclusive-or ("XOR") (represented in FIG. 3 by a plus sign in a circle) of the table-based hash function output with the Input Portion A 310. Further, the next round 320B includes applying a table-based hash function to the output of the XOR of the first round 320A, and then performing an XOR of this table-based hash function output with the Input Portion B 315. As shown, the Feistel network may repeat a particular number of rounds, with the output values of each round 320 may be used as input values of the next round 320. After completing the rounds 320 of the Feistel network, the Output Portion A 340 and the Output Portion B 345 may be concatenated or otherwise combined to generate the output 350. After block 230, the process 200 may be completed. An example implementation of the table-based hash function applied in block 230 is discussed below with reference to FIGS. 4-6.

Figure 4:
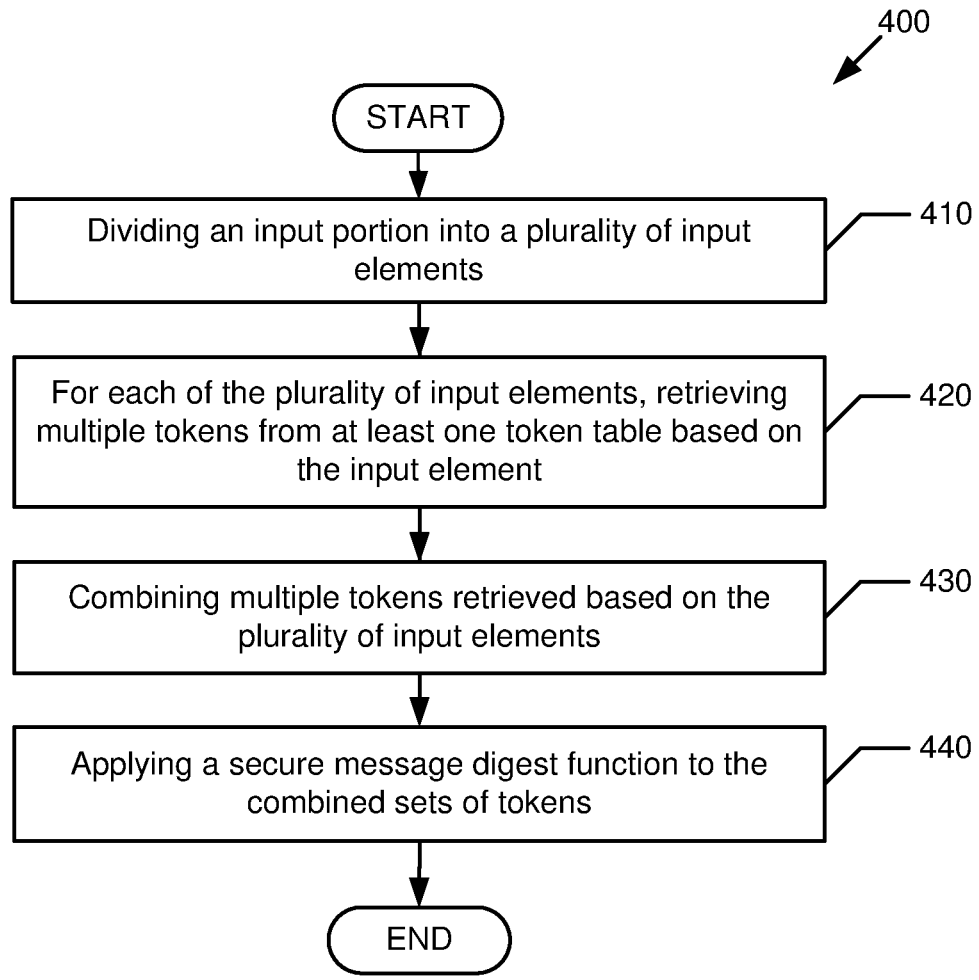
FIG. 4 is a flow diagram of an example process, in accordance with some implementations.

Referring now to FIG. 4, shown is an example process 400 for a table-based hash function, in accordance with some implementations. In some examples, the process 400 may be performed by some or all of the tokenization engine 140 shown in FIG. 1. The process 400 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to the example operation 500 shown in FIGS. 5A-5C and the example operation 600 shown in FIG. 6. However, other implementations are also possible.

Block 410 may include dividing an input portion into a plurality of input elements. For example, referring to FIGS. 1 and 3, the tokenization engine 140 may apply a table-based hash function to the Input Portion B 315 (e.g., in round 320A), which may include dividing the Input Portion B 315 into elements of a specified size and/or format (e.g., a "byte" including 32 bits of binary data). For example, referring to FIG. 5A, an input portion (e.g., Input Portion B 315 during round 320A) is illustrated as being divided into bytes of data corresponding to the numerical values "6," "0," "3," and so forth.

Figure 5A:
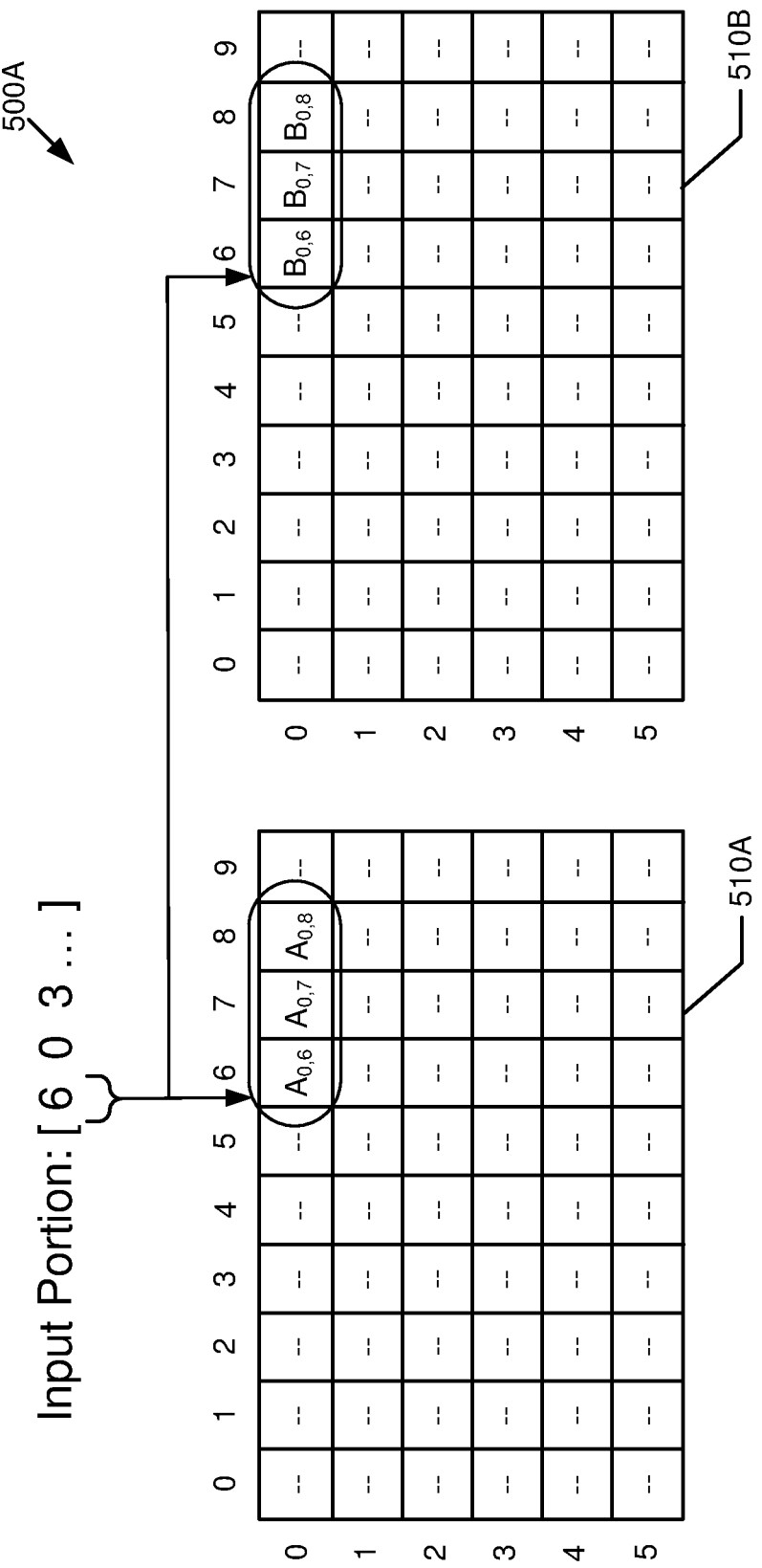

Block 420 may include, for each of the plurality of input elements, retrieving a set of tokens from at least one token table based on the input element. For example, referring to FIGS. 1 and 5A, the tokenization engine 140 may use the first byte value "6" as an index into two different token tables 510A, 510B. Note that, in the example of FIG. 5A, the byte order is indexed to the row, and therefore the first byte value indexes to the first row in tables 510A, 510B. Further, in the example of FIG. 5A, the numerical value of the byte is indexed to the column identifier, and therefore the byte value "6" indexes to the column "6" of tables 510A, 510B. In some implementations, the retrieved set of tokens includes a particular number of sequential tokens (e.g., three) that begin at the indexed token. Therefore, as shown in FIG. 5A, the first byte value "6" causes the selection of a set of three sequential tokens from table 510A (i.e., $A_{0,6}$, $A_{0,7}$, and $A_{0,8}$), and also causes the selection of a set of three sequential tokens from table 510B (i.e., $B_{0,6}$, $B_{0,7}$, and $B_{0,8}$).

Figure 5B:
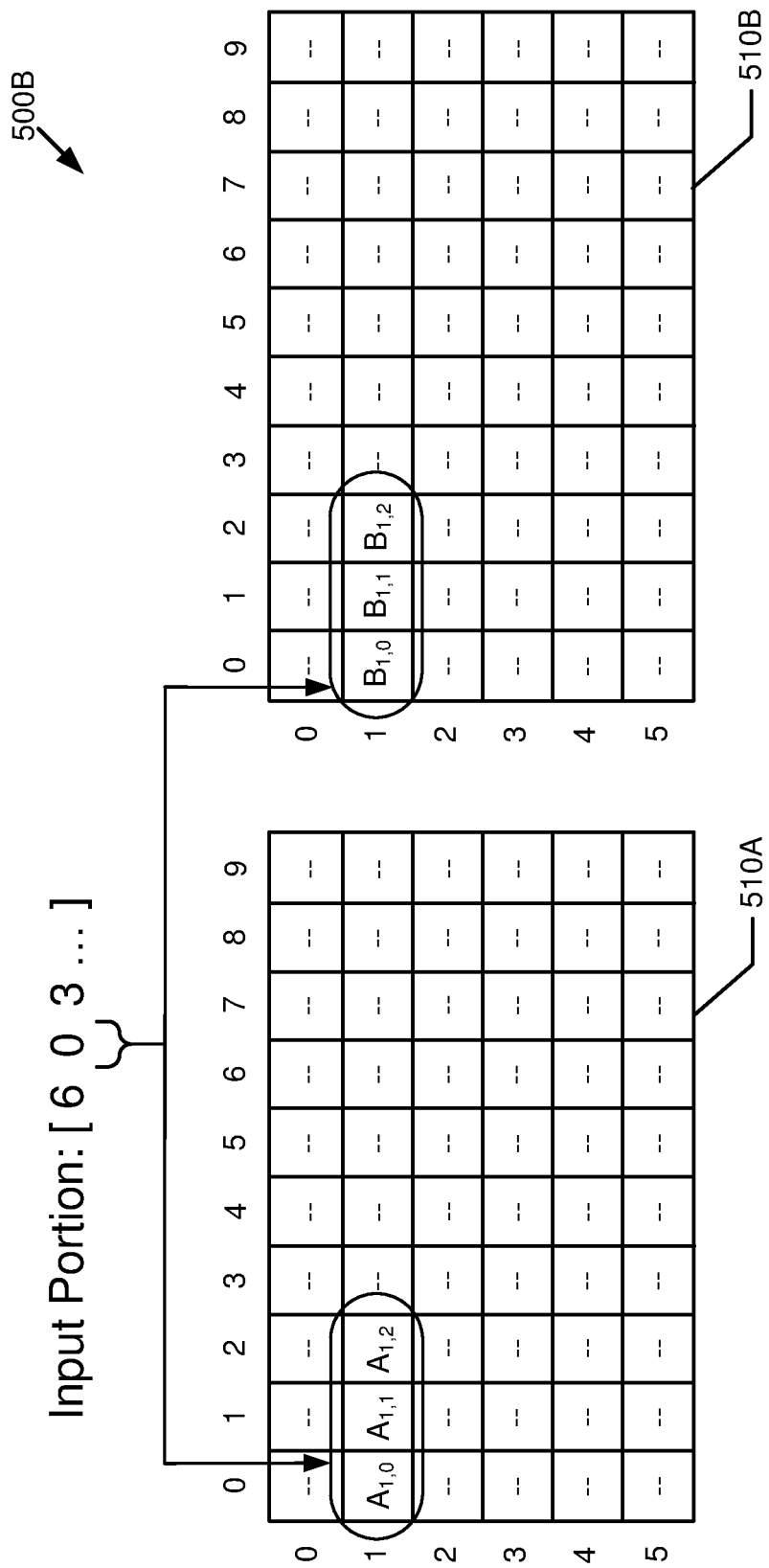

In another example, referring to FIG. 5B, the second byte value "0" causes the selection of a set of three sequential tokens from the second row of table 510A (i.e., $A_{1,0}$, $A_{1,1}$, and $A_{1,2}$), and also causes the selection of a second set of three sequential tokens from the second row of table 510B (i.e., $B_{1,0}$, $B_{1,1}$, and $B_{1,2}$). In yet another example, referring to FIG. 5C, the third byte value "3" causes the selection of a set of three sequential tokens from the third row of table 510A (i.e., $A_{2,3}$, $A_{2,4}$, and $A_{2,5}$), and also causes the selection of a second set of three sequential tokens from the third row of table 510B (i.e., $B_{2,3}$, $B_{2,4}$, and $B_{2,5}$). In some implementations, the selection of sets of tokens from the token tables 510A, 510B may be continued based on each byte value in the input portion that is currently being processed by the table-based hash function. Further, in some implementations, each token retrieved from the tables 510A, 510B may be a byte value (e.g., 32 bits of data). Note that, referring to FIGS. 5A-5C, the retrieval of three tokens per input element is merely an example implementation, and other implementations are not limited in this regard. For example, other implementations may retrieve four tokens per input element, five tokens per input element, and so forth. In some examples, the number of tokens retrieved may be a fixed number that is selected based on the desired length of the output of the table-based hash function.

Figure 5C:
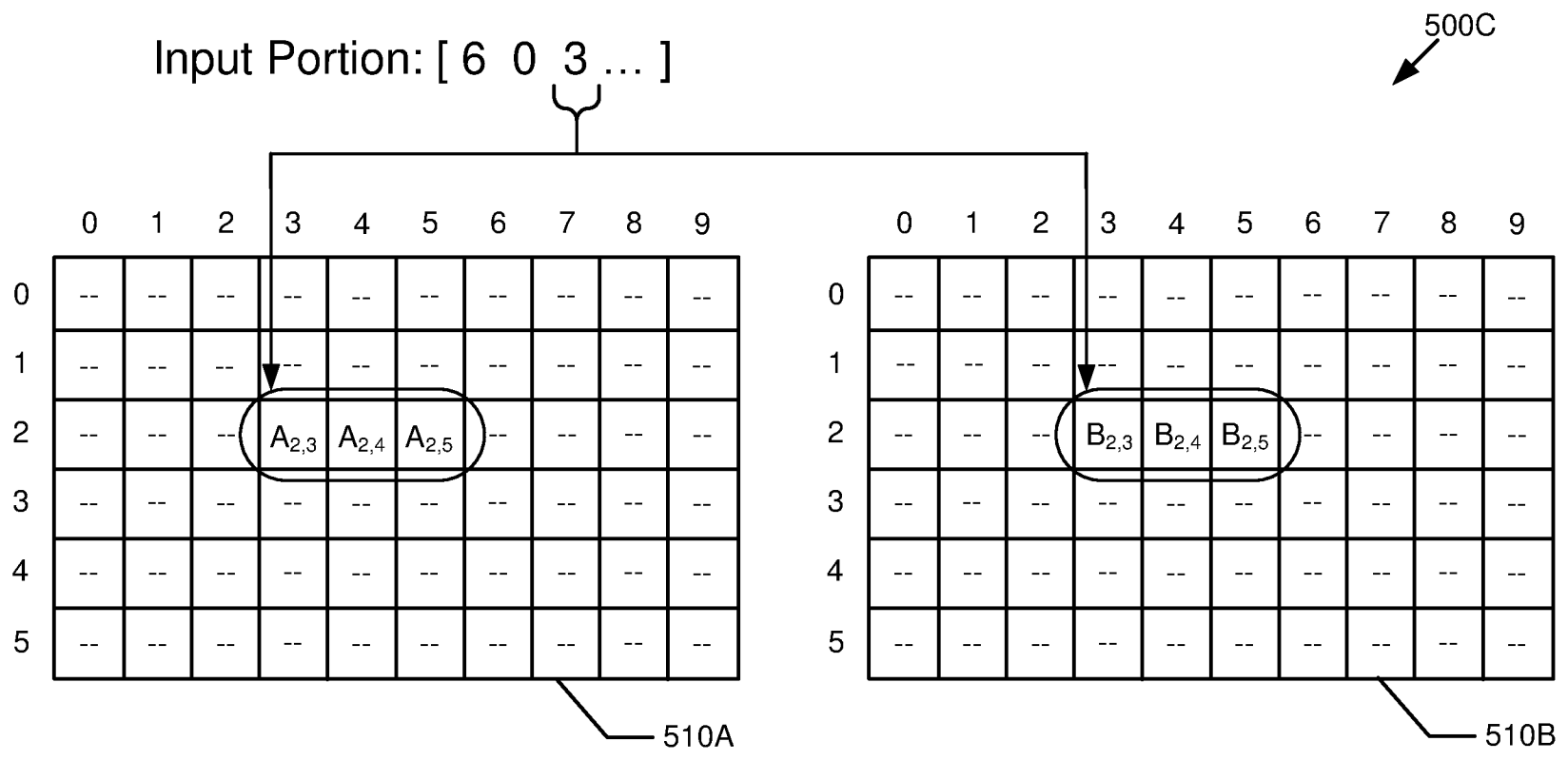

Block 430 may include combining the sets of tokens retrieved based on the plurality of input elements. For example, referring to FIGS. 1 and 6, the box 610 may represent the sets of tokens retrieved by the tokenization engine 140 (at block 420). In the example operation 600, the first row 615A in box 610 represents a concatenation of the six tokens retrieved based on the first byte value "6" (i.e., $A_{0,6}$, $A_{0,7}$, $A_{0,8}$, $B_{0,6}$, $B_{0,7}$, $B_{0,8}$), as shown in FIG. 5A. Further, the second row 615B represents a concatenation of the six tokens retrieved based on the second byte value "0" (as shown in FIG. 5B), and the third row 615C represents a concatenation of the six tokens retrieved based on the third byte value "3" (as shown in FIG. 5C). Furthermore, the remaining rows 615D may represent additional sets of tokens retrieved from token tables 510A, 510B based on other byte values included in the input portion that is currently being processed by the table-based hash function. In some implementations, the remaining rows 615D may also represent sets of tokens retrieved from token tables other than the token tables 510A, 510B. For example, the token tables 510A, 510B may have fewer rows than the number of byte values in the input portion, and therefore the indexing of the byte values may continue at the rows of an additional pair of token tables once the available rows of token tables 510A, 510B have already been used during the indexing.

Figure 6:
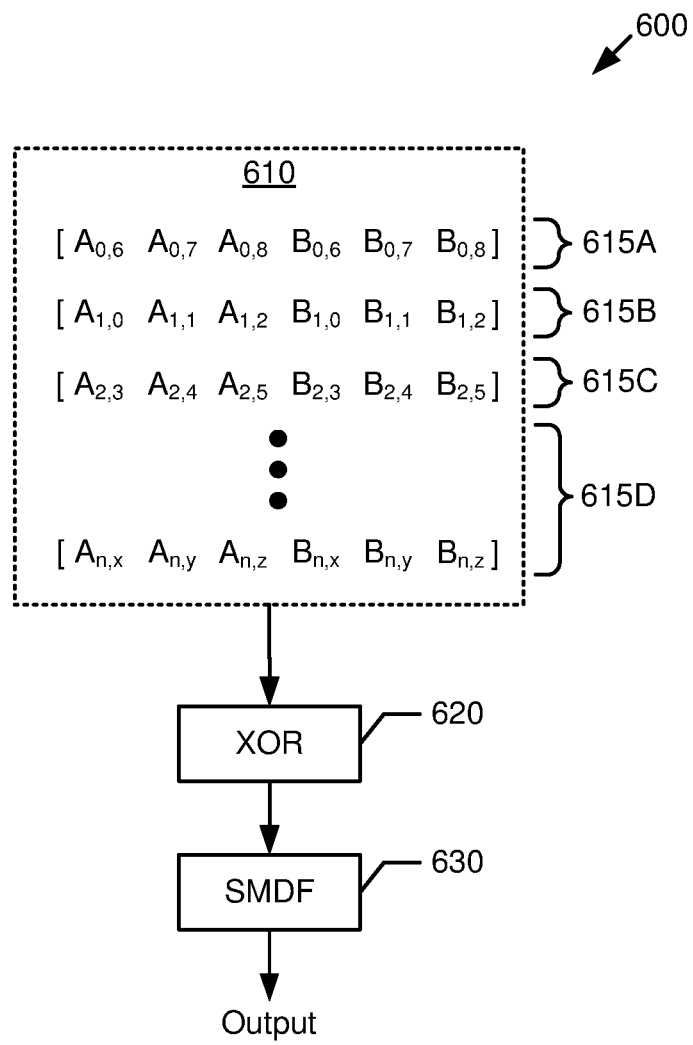
FIG. 6 is an illustration of an example operation, in accordance with some implementations.

As shown in FIG. 6, in some implementations, the example operation 600 may include performing an XOR operation 620 to combine the tokens in each row of box 610. For example, the XOR operation 620 may combine the first token in each row to generate a first output token, combine the second token in each row to generate a second output token, and so forth. Accordingly, the output of the XOR operation 620 may be a set of six concatenated tokens (e.g., six concatenated byte values). Note that the output of six tokens from the XOR operation 620 is merely an example implementation, and other implementations are not limited in this regard. For example, other implementations may generate an XOR output of eight tokens, ten tokens, and so forth.

Referring again to FIG. 4, block 440 may include applying a secure message digest function to the combined sets of tokens to obtain a table-based hash value. For example, referring to FIG. 6, a secure message digest function (SMDF) 630 may be applied to the output of the XOR operation 620. In some examples, the SMDF 630 may include a hash-based message authentication code (HMAC) using a secure hash algorithm (SHA), such as HMAC-SHA256, HMAC-SHA3, and so forth. In some implementations, the SMDF 630 may be applied in multiple iterations, with the first iteration including applying the SMDF 630 to a concatenation of a prefix value and the output of the XOR operation 620, and with subsequent iterations including applying the SMDF 630 to a concatenation of the output of the first iteration and a different integer value. XOR operation 620. In such implementations, the final output of the operation 600 may include a concatenation of the outputs of the multiple iterations of the SMDF 630. Further, in some examples, the number of iterations that are concatenated may be selected to obtain a desired data length of the final output of the operation 600. Referring again to FIG. 4, after block 440, the process 400 may be completed. In some examples, the output of the process 400 and/or the operation 600 may correspond generally to the output of the table-based hash function applied in each round 320 illustrated in FIG. 3.

Figure 7:
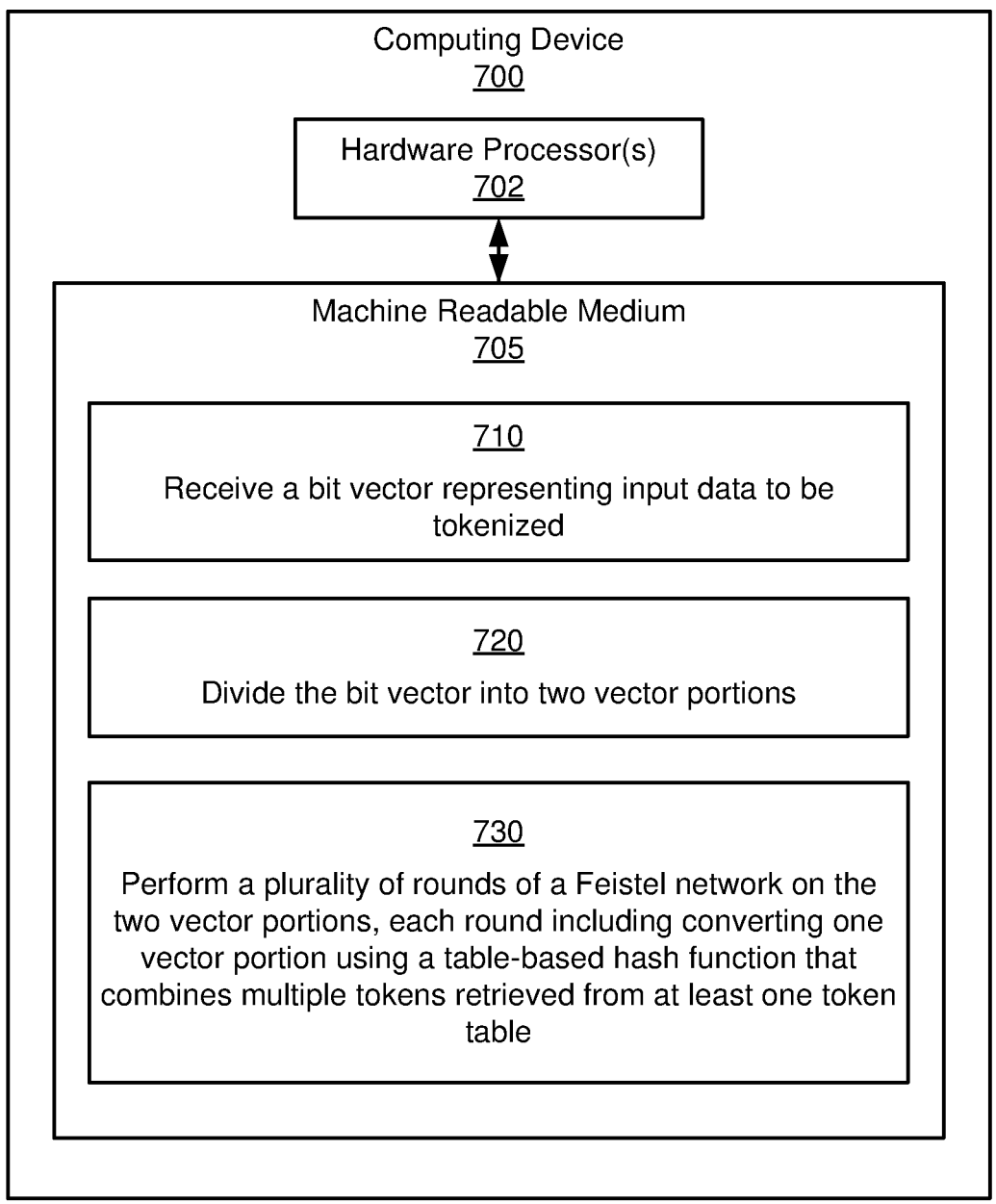
FIG. 7 is a schematic diagram of an example computing device, in accordance with some implementations.

Referring now to FIG. 7, shown is a schematic diagram of an example computing device 700. In some examples, the computing device 700 may correspond generally to the computing device 110 shown in FIG. 1. As shown, the computing device 700 may include hardware processor(s) 702 and machine-readable storage medium 705. The machine-readable storage medium 705 may be a non-transitory medium, and may store instructions 710-730. The instructions 710-730 can be executed by the hardware processor(s) 702.

Instruction 710 may be executed to receive a bit vector representing input data to be tokenized. Instruction 720 may be executed to divide the bit vector into two vector portions. For example, referring to FIGS. 1 and 3, the tokenization engine 140 may receive an input vector 305, and may divide the input vector 305 into Input Portion A 310 and Input Portion B 315.

Instruction 730 may be executed to perform a plurality of rounds of a Feistel network on the two vector portions, with each round including converting one vector portion using a table-based hash function that combines multiple tokens retrieved from at least one token table. For example, referring to FIGS. 1 and 3, the tokenization engine 140 may perform multiple rounds 320 of a Feistel network, where each round 320 includes applying a table-based hash function to an input portion, and performing an XOR of the table-based hash function output with the other input portion. The process 400 (shown in FIG. 4) and/or the operation 600 (shown in FIG. 6) may correspond generally to example implementations of applying the table-based hash function in each round 320 (shown in FIG. 3).

Figure 8:
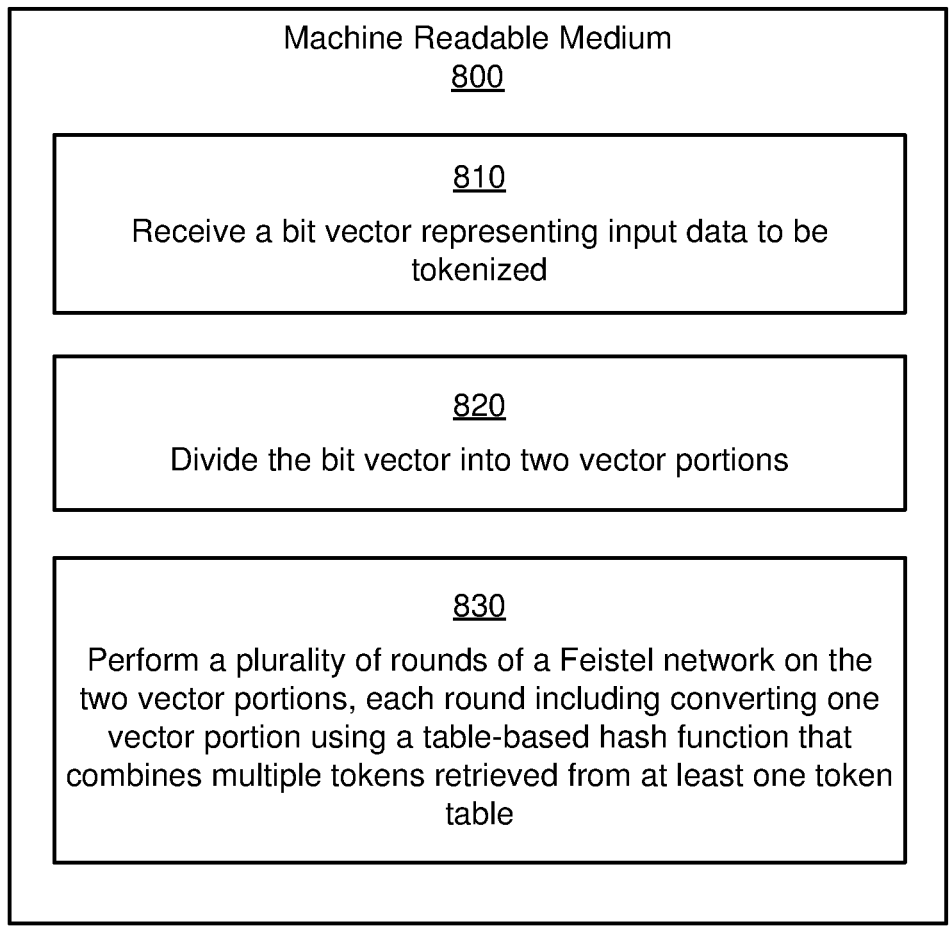
FIG. 8 is a diagram of an example machine-readable medium storing instructions, in accordance with some implementations.

Referring now to FIG. 8, shown is machine-readable medium 800 storing instructions 810-830, in accordance with some implementations. The instructions 810-830 can be executed by any number of processors (e.g., the processor(s) 110 shown in FIG. 1). The machine-readable medium 800 may be a non-transitory storage medium, such as an optical, semiconductor, or magnetic storage medium.

Instruction 810 may be executed to receive a bit vector representing input data to be tokenized. Instruction 820 may be executed to divide the bit vector into two vector portions. For example, referring to FIGS. 1 and 3, the tokenization engine 140 may receive an input vector 305, and may divide the input vector 305 into Input Portion A 310 and Input Portion B 315.

Instruction 830 may be executed to perform a plurality of rounds of a Feistel network on the two vector portions, with each round including converting one vector portion using a table-based hash function that combines multiple tokens retrieved from at least one token table. For example, referring to FIGS. 1 and 3, the tokenization engine 140 may perform multiple rounds 320 of a Feistel network, where each round 320 includes applying a table-based hash function to an input portion, and performing an XOR of the table-based hash function output with the other input portion.

As described above with reference to FIGS. 1-8, some implementations may provide improved tokenization for input data with arbitrary sizes and/or formats. In some implementations, the input data may be processed through multiple rounds of a Feistel network, where each round includes performing a table-based hash function. The table-based hash function may be applied to uniform sized portions of the input data, without regard to the specific format of the input data. Accordingly, implementations may provide an improved tokenization system that can tokenize arbitrary data types in a secure manner.

Note that, while various example implementations are described above with reference to FIGS. 1-8, implementations are not limited by these examples. For example, some operations shown in FIGS. 2-6 may be excluded and/or performed in different order(s). In another example, the processes shown in FIGS. 2-6 may include additional operations (e.g., data formatting, length adjustments and/or padding, format conversions, and so forth).

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above.

What is claimed is:

1. A computing device to tokenize input data and protect confidentiality of the input data, the computing device comprising:
a hardware processor; and
a machine-readable storage storing instructions executable by the hardware processor to:
receive the input data to be tokenized;
divide the input data into first and second vector portions;
perform a plurality of rounds of a Feistel network on the first and second vector portions, wherein, in a first round of the Feistel network, the instructions cause the hardware processor to:
convert the first vector portion into a first hash output portion using a table-based hash function, by: dividing the first vector portion into a plurality of bytes of data; for each byte of the plurality of bytes of data of the first vector portion, retrieving a set of sequential tokens from a plurality of token tables based on a value of the byte of the plurality bytes of data, wherein a plurality of sets of sequential tokens are retrieved for the plurality of bytes of data of the first vector portion; and combining the plurality of sets of sequential tokens into one string of output tokens for the first vector portion, wherein the string of output tokens for the first vector portion is the first hash output portion, and
perform an exclusive-or (XOR) operation on the first hash output portion and the second vector portion of the input data to generate a first XOR output portion, and
wherein, in a second round of the Feistel network, the instructions cause the hardware processor to:
convert the first XOR output portion into a second hash output portion using the table-based hash function, by: dividing the first XOR output portion into a plurality of bytes of data; for each byte of the plurality of bytes of data of the first XOR output portion, retrieving a set of sequential tokens from the plurality of token tables based on a value of the byte of data, wherein a plurality of sets of sequential tokens are retrieved for the plurality of bytes of data of the first XOR output portion; and combining the plurality of sets of sequential tokens into one string of output tokens for the first XOR output portion, wherein the string of output tokens for the first XOR output portion is the second hash output portion, and
perform an XOR operation on the second hash output portion and the first vector portion of the input data to generate a second XOR output portion; and
combine the first XOR output portion and the second XOR output portion to generate a tokenized output of the input data.

2. The computing device of claim 1, wherein, to combine the plurality of sets of sequential tokens into the string of output tokens for the first vector portion, the instructions cause the hardware processor to:
obtain one token from each set of the plurality sets of sequential tokens to yield obtained tokens, and
combine the obtained tokens into one output token of the string of output tokens for the first vector portion.

3. The computing device of claim 1, wherein the instructions cause the hardware processor to:
apply a secure message digest function to the string of output tokens for the first vector portion.

4. The computing device of claim 2, wherein to combine the obtained tokens into the one output token, the instructions cause the hardware processor to:
perform an exclusive-or (XOR) operation to combine the obtained tokens into the one output token of the string of output tokens for the first vector portion.

5. The computing device of claim 1, wherein, for each byte of data, to retrieve the set of sequential tokens from the plurality of token tables based on the value of the byte of data of the first vector portion, the instructions cause the hardware processor to:
retrieve a first sequence of tokens from a first token table based on the value of the byte of data of the first vector portion,
retrieve a second sequence of tokens from a second token table based on the value of the byte of data of the first vector portion, and
concatenate the first sequence of tokens and the second sequence of tokens into the set of sequential tokens for the byte of data of the first vector portion.

6. The computing device of claim 1, wherein each byte of data of the first vector portion is a byte of binary data.

7. The computing device of claim 1, wherein, to divide the first vector portion into the plurality of bytes of data, the instructions cause the hardware processor to:
divide the first vector portion into uniform-sized bytes of data without regard to a specific format of the first vector portion.

8. A computer implemented method for tokenizing input data and protecting confidentiality of the input data, the method comprising:
receiving, by a tokenization engine, the input data to be tokenized;
dividing, by the tokenization engine, the input data into first and second vector portions;
performing, by the tokenization engine, a plurality of rounds of a Feistel network on the first and second vector portions, wherein performing a first round of the Feistel network comprises:
converting the first vector portion into a first hash output portion using a table-based hash function, by: dividing the first vector portion into a plurality of bytes of data; for each byte of the plurality of bytes data, retrieving a set of sequential tokens from a plurality of token tables based on a value of the byte of the plurality of bytes of data, wherein a plurality of sets of sequential tokens are retrieved for the plurality of bytes of data of the first vector portion; and combining the plurality of sets of sequential tokens into one string of output tokens for the first vector portion, wherein the string of output tokens for the first vector portion is the first hash output portion, and performing an exclusive-or (XOR) operation on the first hash output portion and the second vector portion of the input data to generate a first XOR output portion, and wherein performing a second round of the Feistel network comprises:

converting the first XOR output portion into a second hash output portion using the table-based hash function, by: dividing the first XOR output portion into a plurality of bytes of data; for each byte of the plurality of bytes of data of the first XOR output portion, retrieving a set of sequential tokens from the plurality of token tables based on a value of the byte of the plurality of bytes of data, wherein a plurality of sets of sequential tokens are retrieved for the plurality of bytes of data of the first XOR output portion; and combining the plurality of sets of sequential tokens into one string of output tokens for the first XOR output portion, wherein the string of output tokens for the first XOR output portion is the second hash output portion, and performing an XOR operation on the second hash output portion and the first vector portion of the input data to generate a second XOR output portion; and combining, by the tokenization engine, the first XOR output portion and the second XOR output portion to generate a tokenized output of the input data.

9. The computer implemented method of claim 8, wherein combining the plurality of sets of sequential tokens into the string of output tokens for the first vector portion comprises:

obtaining one token from each set of the plurality sets of sequential tokens to yield obtained tokens, and combining the obtained tokens into one output token of the string of output tokens for the first vector portion.

10. The computer implemented method of claim 8, further comprising:

applying a secure message digest function to the string of output tokens for the first vector portion.

11. The computer implemented method of claim 9, wherein combining the obtained tokens into the one output token comprises performing an exclusive-or (XOR) operation to combine the obtained tokens into the one output token of the string of output tokens for the first vector portion.

12. The computer implemented method of claim 8, wherein, for each byte of data, retrieving the set of sequential tokens based on the value of the byte of data of the first vector portion comprises:

retrieving a first sequence of tokens from a first token table based on the value of the byte of data of the first vector portion, retrieving a second sequence of tokens from a second token table based on the value of the byte of data of the first vector portion, and concatenating the first sequence of tokens and the second sequence of tokens into the set of sequential tokens for the byte of data of the first vector portion.

13. The computer implemented method of claim 8, wherein each byte of data of the first vector portion is a byte of binary data.

14. The computer implemented method of claim 8, wherein dividing the first vector portion into the plurality of bytes of data comprises:

dividing the first vector portion into uniform-sized bytes of data without regard to a specific format of the first vector portion.

15. A non-transitory machine-readable storage medium storing instructions that upon execution cause a processor to:

receive input data to be tokenized;

divide the input data into first and second vector portions;

perform a plurality of rounds of a Feistel network on the first and second vector portions, wherein, in a first round of the Feistel network, the instructions cause the processor to:

convert the first vector portion into a first hash output portion using a table-based hash function, by: dividing the first vector portion into a plurality of bytes of data; for each byte of the plurality of bytes of data of the first vector portion, retrieving a set of sequential tokens from a plurality of token tables based on a value of the byte of the plurality of bytes of data, wherein a plurality of sets of sequential tokens are retrieved for the plurality of bytes of data of the first vector portion; and combining the plurality of sets of sequential tokens into one string of output tokens for the first vector portion, wherein the string of output tokens for the first vector portion is the first hash output portion, and perform an exclusive-or (XOR) operation on the first hash output portion and the second vector portion of the input data to generate a first XOR output portion, and wherein, in a second round of the Feistel network, the instructions cause the processor to:

convert the first XOR output portion into a second hash output portion using the table-based hash function, by: dividing the first XOR output portion into a plurality of bytes of data; for each byte of the plurality of bytes of data of the first XOR output portion, retrieving a set of sequential tokens from the plurality of token tables based on a value of the byte of the plurality of bytes of data, wherein a plurality of sets of sequential tokens are retrieved for the plurality of bytes of data of the first XOR output portion; and combining the plurality of sets of sequential tokens into one string of output tokens for the first XOR output portion, wherein the string of output tokens for the first XOR output portion is the second hash output portion, and perform an XOR operation on the second hash output portion and the first vector portion of the input data to generate a second XOR output portion; and combine the first XOR output portion and the second XOR output portion to generate a tokenized output of the input data.

16. The non-transitory machine-readable storage medium of claim 15, wherein, to combine the plurality of sets of sequential tokens into the string of output tokens for the first vector portion, the instructions cause the processor to:

obtain one token from each set of the plurality sets of sequential tokens to yield obtained tokens, and combine the obtained tokens into one output token of the string of output tokens for the first vector portion.

17. The non-transitory machine-readable storage medium of claim 15, wherein the instructions cause the processor to:

apply a secure message digest function to the string of output tokens for the first vector portion.

18. The non-transitory machine-readable storage medium of claim 16, wherein to combine the obtained tokens into the one output token, the instructions cause the processor to:

perform an exclusive-or (XOR) operation to combine the obtained tokens into the one output token of the string of output tokens for the first vector portion.

19. The non-transitory machine-readable storage medium of claim 15, wherein, for each byte of data, to retrieve the set of sequential tokens from the plurality of token tables based on the value of the byte of data of the first vector portion, the instructions cause the processor to:
- retrieve a first sequence of tokens from a first token table based on the value of the byte of data of the first vector portion,
- retrieve a second sequence of tokens from a second token table based on the value of the byte of data of the first vector portion, and
- concatenate the first sequence of tokens and the second sequence of tokens into the set of sequential tokens for the byte of data of the first vector portion.

20. The non-transitory machine-readable storage medium of claim 15, wherein, to divide the first vector portion into the plurality of bytes of data, the instructions cause the processor to:
- divide the first vector portion into uniform-sized bytes of data without regard to a specific format of the first vector portion.

\* \* \* \* \*